Feb. 6, 1962

R. H. ENGELMANN 3,019,640

METHOD OF AND MEANS FOR MEASURING TORQUE OF
AN ELECTRIC MOTOR DRIVE

Filed Oct. 27, 1959

INVENTOR.
RICHARD H. ENGELMANN
BY
J. Warren Kinney Jr.
ATTORNEY

UNITED STATES PATENT OFFICE

3,019,640
METHOD OF AND MEANS FOR MEASURING TORQUE OF AN ELECTRIC MOTOR DRIVE

Richard H. Engelmann, Cincinnati, Ohio, assignor to Jack N. Binns, Cincinnati, Ohio
Filed Oct. 27, 1959, Ser. No. 849,044
18 Claims. (Cl. 73—136)

This invention relates to electric motors, and more particularly to a method of and means for continuously and automatically measuring and indicating, and, if desired, recording the torque developed by electric motors under load.

In various manufacturing operations electric motors handle heavy loads. In many situations, it is highly important to know the magnitude of the torque developed by such motors at all times. For example, in roll lathes where large steel rolls are subjected to cutting, shaping and finishing operations, the load involved in driving such rolls against the resistance of the tools is very high. Excessively high torques for a given motor may indicate the cuts are too deep or that the motor is overloaded. These are factors and considerations to be taken into account and are well known to those skilled in the metal turning art.

This invention relates to a method of and means for accurately measuring the torque developed by electric motors, both D.C. and A.C., and apparatus for automatically measuring and indicating the instantaneous torque developed by such motors, and if desired, to record the torque values as well.

The torque developed by a D.C. motor is proportional to the product of the flux per pole and the armature current. The torque T may be expressed by the equation:

$$(1) \quad T = K_1 \theta I_a$$

where $T$ = torque in pound feet
$K_1$ = a motor constant which is dependent on the number of armature conductors, paths, poles, etc.
$\theta$ = flux per pole and
$I_a$ = armature current.

Armature current is susceptible of direct measurement, but means of directly measuring flux are unsatisfactory, unreliable and inaccurate for the purpose of measuring accurately the torque developed by a motor in the handling of its work load.

For the purposes of this invention, the flux may be measured by an indirect method and means which is based on the equation $$(2) \quad E_g = K_2 \theta N$$

$E_g$ = the generated voltage in the armature
$K_2$ = a motor constant
$N$ = armature speed in r.p.m., and $\theta = \dfrac{E_g}{K_2 N}$ = flux per hole, as above From the equation $E_g = K_2 \theta N$, the torque T may be derived from Equations 1 and 2 above, namely, $$(3) \quad T = \frac{K_1 I_a E_g}{K_2 N}$$

If it be assumed that $E_g$ is equal to V, the applied source voltage, then the torque may be expressed by the equation $$(4) \quad T = \frac{K_1 V}{K_2} \times \frac{I_a}{N}$$

In order to measure the torque in accordance with Equation 4 above, it is necessary that the product of source voltage V and armature current $I_a$ be obtained, and that the quotient of this said product and of the motor speed N be derived. The product of two factors may be derived by means of a dynamometer meter, which provides a product of two currents, but not a quotient of two currents. To obtain a meter deflection proportional to torque by means of a dynamometer type meter, it is necessary that the current in one coil of the meter be proportional to source voltage V, the current in the second coil be proportional to armature current $I_a$, and that one of the two coil currents shall also be inversely proportional to the speed N of the motor over the normal speed range thereof.

In order to generate a current which is inversely proportional to speed N of the motor and directly proportional either to source voltage V or to armature current $I_a$, the following means is used: An A.C. tachometer generator having a field winding excited either by supply voltage V or armature current $I_a$ is driven by the motor shaft, either directly or through a fixed ratio drive. The output voltage of such a generator is a linear function of speed and also of the voltage or current used to excite the field providing the magnetic circuit does not approach saturation. The output frequency of such a tachometer generator also increases linearly with speed.

The output voltage $E_o$ of the tachometer generator is expressed as $$(5) \quad E_o = K_t I_f N$$

where $E_o$ = tachometer output voltage
$I_f$ = field current in the tachometer, which may be directly proportional to source voltage V or may be a portion of armature current $I_a$
$K_t$ = a voltage constant depending on the tachometer construction.

The frequency $f_o$ of the voltage $E_o$ is expressed by the equation $$(6) \quad f_o = K_f N$$

where $K_f$ is a frequency constant which again is dependent on generator construction.

Since the coils of the dynamometer are essentially resistive, application of the output voltage of the tachometer-generator to one coil of the dynamometer meter will produce a current directly proportional to source voltage V or to armature current $I_a$, whichever is used to excite the field of the tachometer generator, but the current is also directly proportional to motor speed N, which is the inverse of the requirement as shown by Equation 4. That is, we see that it is necessary to introduce an electrical circuit or network between the tachometer generator and the dynamometer meter which will cause a current $I_d$ in one coil of the dynamometer meter given by the equation $$(7) \quad I_d = K_d \frac{I_f}{N}$$

where $K_d$ is an arbitrary constant.

Since $I_f$ is a direct function of either source voltage V or armature current $I_a$, the current in the other coil of the dynamometer meter must be directly proportional either to source voltage V or armature current $I_a$, whichever has not been used to produce field current $I_f$ in the tachometer generator. That is, by the introduction of the appropriate network, the current in one coil of the dynamometer meter is caused to be directly proportional to source voltage V, the current in the other coil is caused to be directly proportional to armature current $I_a$, and the current in one of the coils is also inversely proportional to motor speed N. Since the deflection of the dynamometer meter is proportional to the product of the currents in the two coils, the deflection will be directly proportional to the product of source voltage V and armature current $I_a$, and inversely proportional to motor speed N, and the deflection is therefore a direct measure of torque in accordance with Equation 4.

The current $I_d$ in the dynamometer coil supplied through the network from the tachometer will be given by (8) $$I_d = \frac{E_d}{R_d}$$

where
$R_d$ = the resistance of the dynamometer coil.
$E_d$ = output voltage of the network.

By manipulation of Equation 7, we obtain (9) $$I_d = \frac{K_d}{K_t} \times \frac{K_t I_f N}{N^2}$$

Substituting $E_o = K_t I_f N$ from Equation 5 and $$N^2 = \frac{f_o^2}{K_f^2}$$

obtained by squaring both sides of Equation 6 and rearranging, Equation 9 becomes

(10) $$I_d = \frac{K_d K_f^2}{K_t} \times \frac{E_o}{f_o^2}$$

Substituting the expression for $I_d$ from Equation 8 in Equation 10 and rearranging, we obtain

(11) $$\frac{E_d}{E_o} = \frac{K_d R_d K_f^2}{K_t} \times \frac{1}{f_o^2}$$

Equation 11 states the required characteristic of the electrical circuit or network which must be interposed between the tachometer generator and the dynamometer meter; that is, the network must produce an output voltage $E_d$ directly proportional to the voltage $E_o$ generated by the tachometer generator and inversely proportional to the square of the frequency $f_o$ of the voltage generated by the tachometer generator.

A network which will give this response is the so-called "Maximally Flat" or "Butterworth" response of the second order, which may be expressed by the equation

(12) $$\left|\frac{E_d}{E_o}\right| = \frac{H}{\sqrt{1+\omega^4}}$$

where
$H$ = a constant
$\omega = 2\pi f$ = angular frequency in rad./sec.

Equation 12 represents a normalized all-pole function in which the poles are located at $$\frac{1}{\sqrt{2}}(-1+j1)$$

and $$\frac{1}{\sqrt{2}}(-1-j1)$$

on the complex-plane. An alternate expression for $E_d/E_o$ may be written as follows:

(13) $$\frac{E_d}{E_o} = \frac{H}{1+1.414jw-w^2} = \frac{H}{1-w^2+j1.414w}$$

where $j = 1 \angle 90°$

Evaluation of the functions of (13) above shows that $E_d/E_o$ is within ±5% of the required function

(14) $$\frac{E_d}{E_o} = \frac{K_d R_d K_f^2}{K_T f_o^2}$$

for all values of $w > 3$, allowing for the proper scaling, and can be made closer if a higher value of $w$ is used for a lower limit.

A somewhat improved fitting of the desired curve can be accomplished by the use of a second order Tchebysheff network for which:

(15) $$\left|\frac{E_d}{E_o}\right| = \frac{H}{\sqrt{1+\epsilon T_2^2(w)}}$$

where $T_2(w) = 2w^2 - 1$
In particular, if $$\epsilon = \frac{1}{10}$$

the desired function is approximated within ±2% for $w$ (normalized) $\geq 2$. In addition, the output voltage of the network is increased by 60% above that available from the Butterworth response. The inductance must have a higher quality factor (Q), however. The tolerances of the components are also much smaller.

For a given tachometer generator and a given motor speed, the actual frequency range is known, and the actual network may then be written by an "Unnormalizing" process. The source impedance in the tachometer and the load impedance of the dynamometer coil are known. The design of the actual network is then executed in the usual fashion, with proper allowance for impedance levels being taken care of by suitable transformers. Since the armature current, $I_a$, is a direct current, the motor being a direct current one, the current $I_d$ must be direct current also. By the employment of rectifiers, direct current $I_d$ is obtained without change of design since the dynamometer torque meter coil is essentially resistive.

An object of this invention is therefore to provide a method whereby the armature current in a motor and another current which is directly proportional to source voltage V and inversely proportional to the speed of rotation of the motor shaft or a shaft driven thereby, are utilized in such fashion as to produce relative rotation of meter windings which indicate directly the torque developed by the motor.

Alternately, a current proportional to the source voltage V and another current which is directly proportional to armature current $I_a$ and inversely proportional to the speed of rotation of the motor shaft N may be utilized in such a fashion as to produce relative rotation of meter windings which indicate directly the torque developed by the motor.

It should be understood that in the case of a motor carrying substantially constant armature current $I_a$ or having a substantially constant source voltage V, that a fixed-field tachometer generator may be used in lieu of one having a variable field.

Another object of the invention is to provide a system of components which interact to generate a meter reading that is substantially directly proportional to the torque developed by the shaft of a motor.

And a still further object of the invention is to provide a method and means of measuring and indicating the torque developed by electric motors, whether A.C. or D.C., in accordance with the above and the discussion and the equations infra.

Other objects of the invention will be apparent to those of ordinary skill in the art to which the invention pertains from the following description taken in conjunction with the accompanying drawings.

Figure 1:
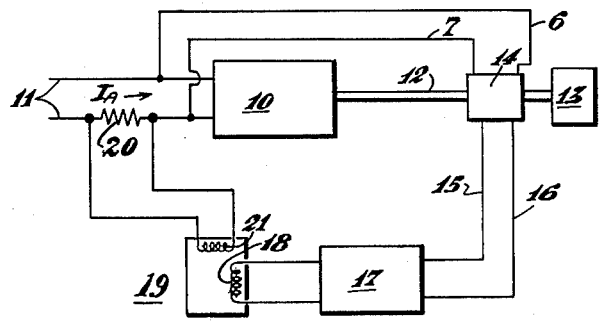
FIG. 1 is a more or less diagrammatic view of a system embodying a form of the invention for measuring the torque of a D.C. motor, showing means for exciting the tachometer generator from the source voltage V.

In FIG. 1 of the drawings a direct current motor 10 is illustrated as being of the type under consideration which, for purposes of explanation, may be assumed to be driving a steel-mill roll 13 in a turning lathe. The motor, as indicated, is supplied with D.C. input voltage from a supply source 11. The drive between the motor shaft 12 and the roll 13 may be direct or through a suitable reduction gear or variable speed drive.

Figure 2:
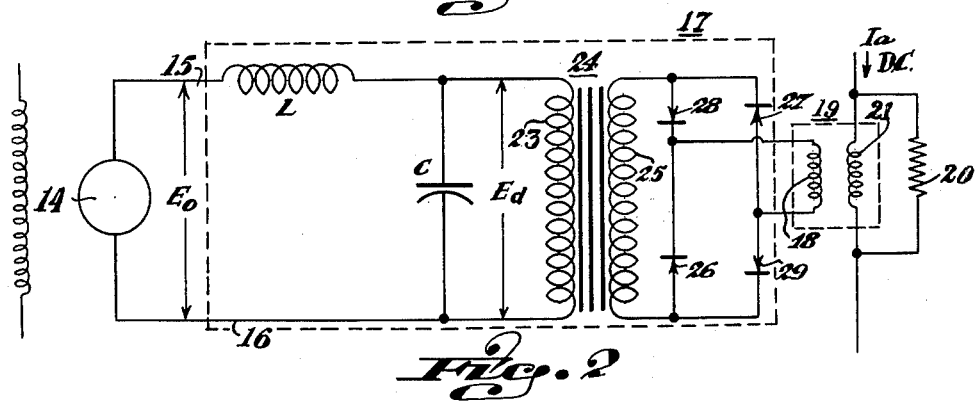
FIG. 2 is a more or less schematic illustration of the circuitry of FIG. 1.

The motor shaft 12 also drives a tachometer generator 14 excited by source voltage V along conductors 6 and 7, driven by the motor shaft 12, and a stator winding in which is developed A.C. voltage. That A.C. voltage is carried by conductors 15 and 16 to a network 17. The network 17 is shown in FIG. 2 and develops an output current that is inversely proportional to the square of the frequency of the voltage supply to lines 15 and 16, and therefore inversely proportional to the r.p.m. of shaft 12.

The output current of the network 17 is converted into D.C. current and supplied to a winding 18 of a two-coil winding meter 19. The meter 19 may operate an indicator (not shown) that registers directly the torque developed by the motor 10 at the shaft 12 which, of course, is proportional to the torque developed by the motor.

In one of the supply conductors to motor 10 is a resistor 20 which develops a voltage drop proportional to the armature current $I_a$ drawn by the motor 10. That voltage drop causes current to flow to a second coil winding 21 of the meter 19. The current in the coil winding 18, which is supplied from the network 17, is D.C., and that supplied to the second coil winding 21 of the meter 18 is also D.C. The coil winding 21 and the resistor 20 being in parallel, the current flowing in the coil winding 21 is in the nature of a shunt current which is proportional to the total armature current $I_a$.

In accordance with the equations supra, the current in coil winding 18 is substantially linearly proportional to the flux in the motor 10 and since the current in winding 21 is linearly proportional to the armature current of motor 10, it follows that the torque T may be given by the equation:

(16) $$T = \frac{K_1 I_a}{K_2} \times \frac{E_g}{N} = \frac{K_1 I_a}{K_2} \times \frac{I_d}{K_d}$$

Thus the arrangement shown in FIG. 1 provides a torque meter that will measure the torque developed by D.C. motors having both variable field and variable armature current control, on the single assumption that the armature IR drop $\ll e_g$.

A typical network 17 is shown in FIG. 2. The tachometer 14 is connected to an inductance-capacity load L and C and to the input winding 23 of a transformer 24. The output winding 25 of the transformer is supplied to a bridge diode circuit comprising diodes 26–29, respectively.

The tachometer 14 develops an A.C. voltage $E_0$ across its terminals, therefore the voltage impressed on the input winding 23 of the transformer is $E_d$. The output voltage of the winding 25 of the transformer may be equal to the voltage $E_d$ or greater or less than that voltage depending on the number of turns in the winding 23 with reference to the winding 25. This output voltage of transformer 24 is rectified to provide a D.C. current for coil winding 18 of torque meter 19.

In accordance with Equation 7, $$I_d = \frac{K_d I_f}{N}$$

the current in the torque meter winding 18 is directly proportional to tachometer generator field current $I_f$ (and hence to supply voltage V), and inversely proportional to the speed of the motor shaft 12. In other words, the current output $I_d$ of the network 17 is directly proportional to the supply voltage V and inversely proportional to N, where N is equal to, or proportional to, the rotational speed of the motor shaft 12.

Figure 3:
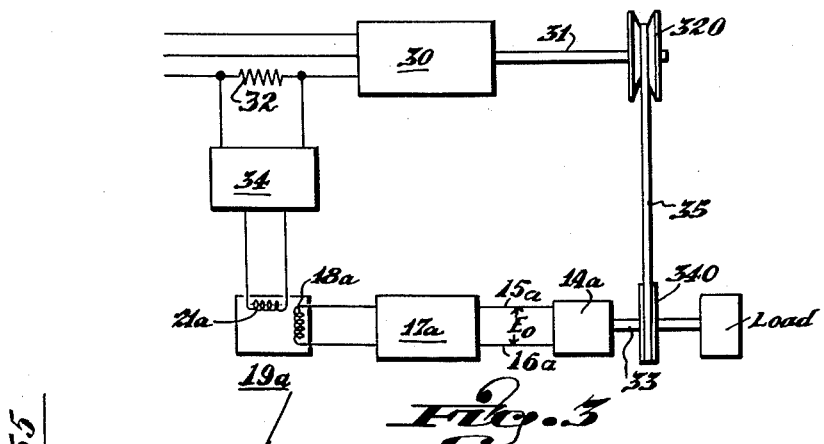
FIG. 3 is a schematic illustration of a system embodying the invention, for measuring the torque developed at a load by a polyphase A.C. motor.

FIG. 3 illustrates an arrangement for measuring the torque developed at the output shaft or the driven shaft of an A.C. motor 30. The motor 30 may be single or polyphase but is shown as a three phase induction motor. It may drive the load directly or indirectly through an adjustable speed pulley and belt drive or other reduction means. As shown, the motor shaft 31 is provided with an adjustable speed pulley 320 and the load driving shaft 33 is provided with an adjustable speed pulley 340. The pulley 340 is driven by a belt 35 running over the driving pulley 320. The shaft 33 may be considered as a shaft that drives work in a lathe, for example, the mill roll referred to supra.

In order to measure the torque input to the work piece as shown in FIG. 3, it is necessary that the tachometer generator 14a be driven off the shaft 33. Tachometer 14a operates on the same principles as the tachometer 14 of FIGS. 1 and 2 (except that it has a fixed field) and develops a voltage $E_0$. That voltage output is supplied to the network 17a, and converted into a D.C. output current, the magnitude of which is inversely proportional to the speed N of the shaft 33. That output current is delivered to the torque meter coil winding 18a. The torque meter also includes a current winding 21a that carries a current which is a desired function of the current I of the motor 30.

Figure 4:
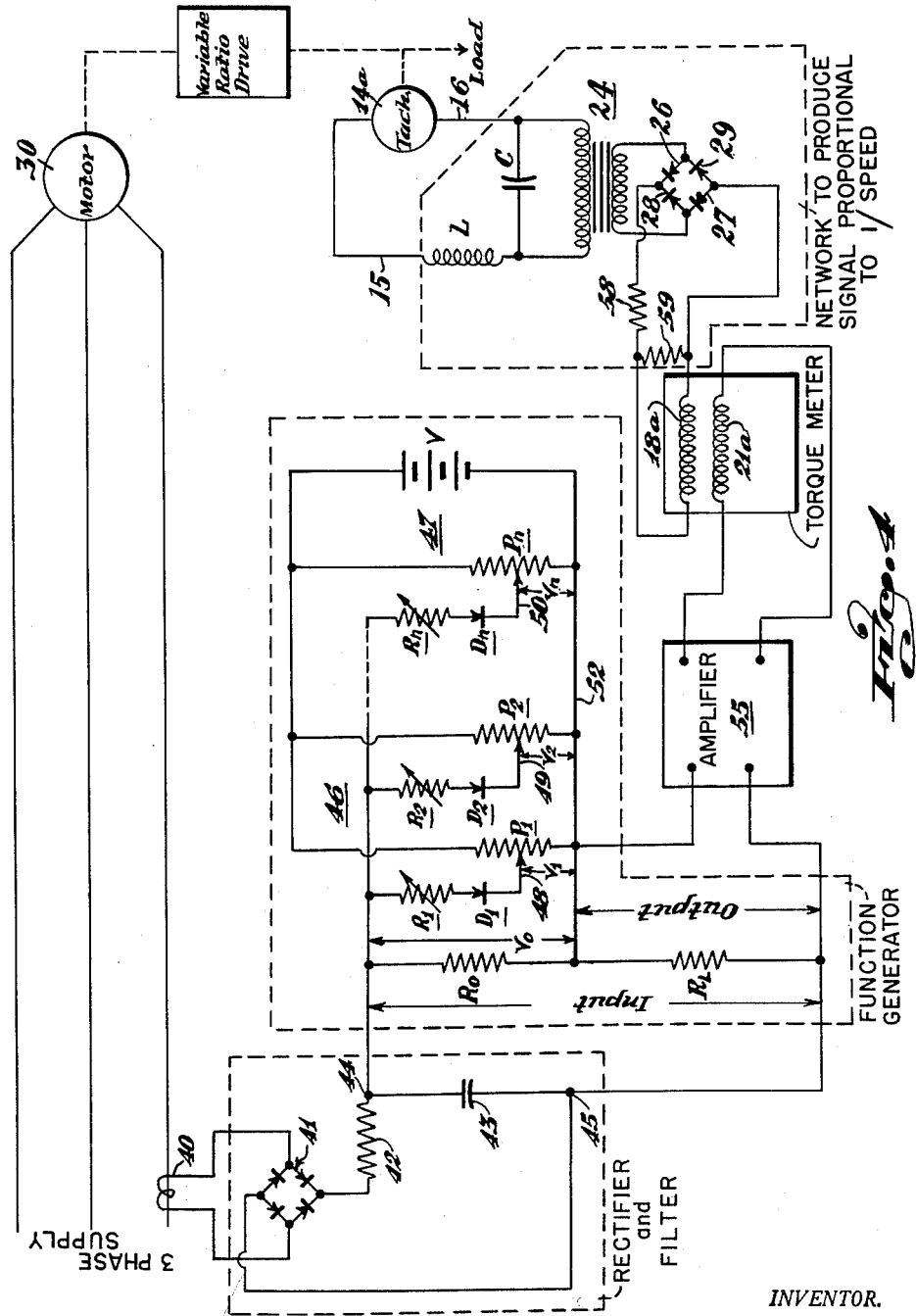
FIG. 4 is a schematic illustration of circuitry including a function generator embodied in the system of FIG. 3.

As shown, the current is measured in one phase of the motor 30 by employing a resistance 32 in series therewith, as in FIG. 3, or a current transformer 40 as shown in FIG. 4. The voltage drop across the resistor 32 provides the input current to a function generator 34, by which is developed an output current, for the coil winding 21a, that is a desired function of the current flowing in one phase of the motor 30.

The torque developed by the output shaft of an A.C. induction motor may be represented by the equation:

(17) $$T_M = \left(\frac{33000 \times 3}{2\pi n \times 746}\right) \times \left(\frac{I^2 R_2'}{S}\right)$$

Equation 17 may be derived as follows:

(18) $$T_M = \left[\frac{33000 \times 3}{2\pi n_1 \times 746}\right] \times \left[\frac{V_1^2 \frac{R_2'}{S}}{\left(R_1 + \frac{R_2'}{S}\right)^2 + (X_1 + X_2')^2}\right]$$

where:

$n_1$ = the synchronous speed of the field;
$V_1$ = supply voltage (line to neutral);
$N_m$ = rotor speed;
$R_2'$ = rotor resistance per phase referred to the stator, assumed to be constant;
$R_1$ = stator resistance per phase;
$X_1$ = stator reactance per phase;

$X_2'$ = rotor reactance per phase referred to the stator;

$$S = \text{slip} = \frac{n_1 - \text{rotor speed}}{n_1} = \frac{n_1 - N_m}{n_1}; \text{ and}$$

746 = watts per horsepower.

The load current to the motor may be designated

(19) $\qquad I = \text{load current}$

(20) $$\dot{I} = \frac{V_1}{R_1 + \frac{R_2'}{S} + J(X_1 + X_2')}$$

(21) $$I^2 = \frac{V_1^2}{\left(R_1 + \frac{R_2'}{S}\right)^2 + (X_1 + X_2')^2}$$

∴ the torque

(22) $$T_M = \frac{33,000 \times 3}{2\pi n_1 \times 746} \times \left(\frac{I^2 R_2'}{S}\right)$$

Substituting for the value(s) in the Equation 22

(23) $$T_M = \frac{33,000 \times 3 \times R_2'}{2\pi 746} \times \frac{I^2}{n_1 - N_m}$$

In cases where an induction motor drives its load through a variable ratio mechanism as shown in FIG. 3, an A.C. tachometer 14a may be driven by the output shaft 33 as shown. The output voltage of the tachometer 14a is converted by the network above described into a D.C. coil current for the dynamometer or torque watt meter 19a, that coil current being inversely proportional to the speed of the driven shaft 33. The line current of the motor or some part of it is passed through the function generator 34 of a type which may be employed in analog computers, and delivered to the other coil 21a of the torque meter 19a. The current delivered to 21a must be proportional to the square of the line current in accordance with Equation 17. This arrangement is satisfactory for motors having low-slip and low exciting current.

In order to obtain accurate measurement of torque developed by high-slip motors or with motors in which the exciting current is high, the function generator 34 should generate the function:

(24) $$T_m N_m = \frac{99,000 R_2'}{(2\pi)746} \times \frac{|\dot{I}_L - \dot{I}_0|^2}{n_1 - N_m} N_m$$

where $I_L$ equals line current, $I_0$ equals exciting current and $(\dot{I}_L - \dot{I}_0)$ equals $\dot{I}$.

Now, since

(25) $$S = \frac{n_1 - N_m}{n_1}$$

then

(26) $\qquad n_1 - N_m = n_1 S$ and

(27) $\qquad n_m = n_1 - n_1 S = n_1(1 - S)$

Therefore Equation 24 becomes

(28) $$T_m N_m = \frac{99,000 R_2'}{2\pi 746} \times |\dot{I}_L - \dot{I}_0|^2 \times \frac{(1 - S)}{S}$$

From Equation 20, $$S = \frac{R_2'}{\sqrt{\left(\frac{V_1}{I} - R_1\right)^2 + (X_1 + X_2')^2}}$$

Consequently

(29) $$T_m N_m = \frac{99,000 R_2'}{2\pi 746} |\dot{I}_L - \dot{I}_0|^2 \left[ \frac{\sqrt{\left(\frac{V_1}{I} - R_1\right)^2 + (X_1 + X_2')^2}}{R_2'} - 1 \right]$$

Since $$I = |\dot{I}_L - \dot{I}_0|$$

(30) $\qquad T_m N_m = f(I_L)$

For a given motor, the function $[f(I_L)]$ is known and consequently the function generator converts the line current $I_L$ into a current which fits the required function $f(I_L)$.

The function generator 34 may, solely by way of example, be of the type shown in FIG. 4. The function generator 34 may be supplied with rectified current that is proportional to the current in one phase of the motor 30. A current transformer 40 may be provided in lieu of resistor 32 and connected to a full wave bridge rectifier 41 to convert the current output of the current transformer to D.C. The output of the rectifier 41 is passed through a filter consisting of a resistor 42 and a capacitor 43, connected in series across the output terminals of the bridge 41. The output from the filter circuit is taken off terminals 44 and 45 and supplied as input to the function generator 34.

The function generator 34 comprises resistors $R_0$ and $R_L$ connected in series to the output terminals 44 and 45 of the rectifier and filter 41, 42, 43. It also includes a network 46 supplied with constant D.C. voltage from a battery 47. That battery may be considered as supplying a voltage V to the network. A plurality of automatic voltage range adjusters in the form of potentiometers $P_1$ to $P_n$ are connected across the battery terminals as shown. Potentiometer $P_1$ has a wiper contact 48 connected to terminal 44 through a diode $D_1$ and an adjustable resistor $R_1$ and to the negative line 52 through the lower part of potentiometer $P_1$. The potentiometer $P_2$ is provided with a wiper contact 49 connected to terminal 44 through a diode $D_2$ and an adjustable resistor $R_2$ and to line 52 through the lower part of potentiometer $P_2$. Similarly, the potentiometer $P_N$ which is the last of a group or series of (N) potentiometers, is provided with a wiper contact 50 connected to terminal 44 through a diode $D_n$ and an adjustable resistor $R_n$ and to the line 52 through the lower part of potentiometer $P_n$.

The potentiometers $P_1$, $P_2$ to $P_n$ provide a plurality of voltages $V_1$, $V_2$ to $V_n$ between the respective wiper contacts thereof and the negative line 52 of the battery network 46. The voltage between terminal 44 and the negative conductor 52 of the battery V is designated as voltage $V_0$.

The output voltage of the function generator being supplied to the amplifier 55, a D.C. output current for the winding 21a of the torque meter is provided. That current is proportional to the line current to the motor 30.

Motor 30 is shown as driving its load through a variable ratio drive. The output shaft 33 thereof drives the tachometer 14a. The tachometer voltage is impressed on the input winding of transformer 24 through an inductance L, a capacitor C being connected across terminals of the input winding. The output winding of the transformer is connected to a bridge rectifier composed of the rectifiers 26 to 29, respectively, for providing full wave rectified D.C. current to the winding 18a of the torque meter.

As stated in connection with the description of FIG. 2, the current in the winding 18a is inversely proportional to the r.p.m. of the armature of the tachometer generator 14a. Since the torque of the motor shaft is given by $N_m T_m = f(I_L)$ in accordance with Equation 30 above, the current in winding 21a of meter 19a is directly proportional to the product of torque at the motor shaft and motor speed. The torque delivered at load shaft 33 is substantially given by the ratio of the effective diameter of pulley 340 to the effective diameter of pulley 320 multiplied by the torque at the motor shaft 31. The speed of load shaft 33 is substantially given by the ratio of the effective diameter of pulley 320 to the effective diameter of pulley 340 multiplied by the speed of motor shaft 31. Therefore, the torque delivered to load shaft 33 is proportional to the product of the torque of motor shaft 31 and the speed of motor shaft 31 and the reciprocal of the speed of shaft 33. Thus, the reaction between the fields of the windings 18a and 21a of the torque meter produces a deflection or motion that is directly proportional to the torque developed by the output shaft of the variable ratio drive when driving a load such as a casting or forging being turned in a lathe into a steel mill roll or where any other operation is involved requiring torque measurement.

The current to the winding 18a (FIG. 4) may be limited by means of a series resistor 58 and a shunt resistor 59. These resistors may be so proportioned that the range of current input into winding 18a may be adjusted to cause the meter to read accurately the torque developed by the motor over the torque range involved.

Figure 5:
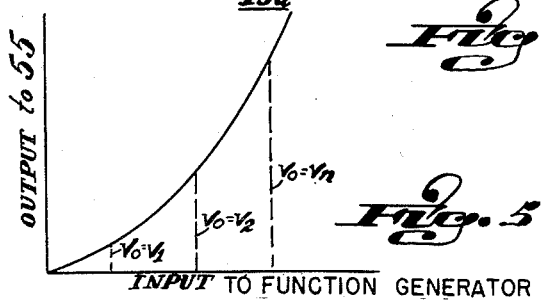
FIG. 5 is a graph showing various voltage changes occurring in the function generator included in FIGS. 3 and 4.

For low input voltages to the function generator (see FIG. 5), the drop across the resistance $R_O$ is small, and the voltage at the bottom of each of the diodes is sufficiently high to prevent conduction by the diodes. As the input rises, the voltage drop across resistor $R_O$ increases linearly until at some point it equals the voltage at the bottom of one of the diodes, say diode $D_1$. This point is adjustable for a fixed value of V by adjusting the position of the wiper contact of potentiometer $P_1$. When that voltage is exceeded diode $D_1$ conducts whereby a parallel combination of resistances $R_O$ and $R_1$ results. The resultant resistance is therefore less than $R_O$, consequently the voltage across $R_L$ rises more rapidly than before, as indicated by the curve and the legends in FIG. 5.

As the input continues to rise, the voltage $V_O$ rises to a value $V_2$, causing diode $D_2$ to conduct, whereby a parallel resistance circuit results in which resistors $R_O$, $R_1$ and $R_2$ are parallel, thereby lowering the total resistance still more. This arrangement can be repeated in as many steps as necessary. The accuracy is improved by using a relatively large number of diode-resistance potentiometer combinations in parallel. Furthermore, so long as the function $f(I_L)$ of Equation 30 is known for the motor, and so long as it is monotonic (and all such curves are monotonic), the function $f(I_L)$ may be fitted as accurately as desired to a particular situation. In essence, the function generator is comprised of a voltage divider, the upper part of which is variable in such a manner as to reduce automatically the resistance of the upper part of the circuit to provide relatively larger inputs to the amplifier as the input voltage rises.

The output of the function generator may be supplied to an amplifier to provide more power for driving one of the coils of the torque meter. In other words, the amplifier 55 may be omitted where the output from the function generator is sufficient to produce the deflection required when supplied to the coil winding 21a of the torque meter.

Thus, in the arrangement of FIGS. 3 and 4, the torque developed by the output shaft 31 of the motor 30 may be measured directly as where that shaft is directly coupled to its load or it may be measured at the output shaft of a transmission as shown. In either case, the tachometer develops a voltage, the magnitude and frequency of which is directly proportional to the speed of the driven shaft. That voltage is converted into D.C. current that is inversely proportional to the motor speed. The input current to the tachometer 30 or a portion thereof is supplied to a function generator 34 which in turn causes an output current which fits the function given by Equation 30 and delivers it to the other winding of the torque meter. The interaction of the fields of the two coils of the torque meter produce a direct and accurate measurement and indication of the instantaneous torque development either at the motor shaft itself or at a driven shaft, the latter being driven by the motor shaft through a transmission, for example.

Having thus described the invention, it will be apparent to those of ordinary skill in the art that various changes may be made to the illustrated embodiments within the scope of the appended claims, without departing from either the spirit or the scope of the invention.

What is claimed is:

1. A method of measuring the torque developed by an electric D.C. motor while driving a load, which method consists in developing a torque meter current that is linearly proportional to the motor armature current, developing a second torque meter current that is directly proportional to source voltage and inversely proportional to the r.p.m. of the motor shaft and developing the product of said torque meter currents, said product being proportional to the torque developed by the motor.

2. A method of measuring the torque developed by a D.C. electric motor while driving a load, which method consists in developing a torque meter current that is linearly proportional to the supply voltage, developing a second torque meter current that is directly proportional to armature current and inversely proportional to the r.p.m. of the motor shaft and developing the product of said torque meter currents, said product being proportional to the torque developed by the motor.

3. A method of measuring the torque developed by a D.C. electric motor, with a constant supply voltage, which method consists in developing a current flow proportional to the armature current, developing an A.C. voltage whose magnitude and frequency are proportional to the r.p.m. of the motor shaft, converting said A.C. voltage to D.C. current which is inversely proportional to said frequency, and passing said currents through relatively movable coil windings having linking magnetic fields to produce a deflection representative of the torque of the motor.

4. A method of measuring the torque developed by a D.C. electric motor having a constant armature current, which method consists in developing a current flow proportional to the armature voltage, developing an A.C. voltage whose magnitude and frequency are proportional to the r.p.m. of the motor shaft, converting said A.C. voltage to D.C. current which is inversely proportional to said frequency, and passing said currents through relatively movable coil windings having linking magnetic fields to produce a deflection representative of the torque of the motor.

5. Apparatus for measuring the torque developed by an A.C. motor driving a load, comprising a meter having separate and relatively movable windings energizable by D.C. current, means developing an A.C. voltage proportional to the load current of the motor, means for rectifying said voltage, a function generator whose input is connected to said rectified voltage and having a D.C. current output whose magnitude varies as the square of the input thereto, means conducting the said D.C. current output of the function generator through one of said meter windings, means driven by said motor for generating a second A.C. voltage whose magnitude and frequency are proportional to the r.p.m. of the motor shaft, means converting said second A.C. voltage into a second D.C. current whose magnitude is inversely proportional to the r.p.m. of the motor shaft, means conducting the said second D.C. current to another of said meter windings, wherein the relative motion of said meter windings is directly proportional to the torque developed by the motor.

6. A method of measuring the torque developed by a D.C. electric motor, which method consists in developing a current flow proportional to the armature current, developing an A.C. voltage whose magnitude is proportional to the r.p.m. of the motor shaft and to the supply voltage and with a frequency proportional to the r.p.m. of the motor shaft, converting said A.C. voltage to D.C. current which is inversely proportional to the said frequency and passing said currents through relatively movable coil windings having linking magnetic fields to produce a deflection representative of the torque of the motor.

7. A method of meauring the torque developed by a D.C. electric motor, which method consists in developing a current flow proportional to the armature voltage, developing an A.C. voltage whose magnitude is proportional to the r.p.m. of the motor shaft and to the armature current, and with a frequency proportional to the r.p.m. of the motor shaft, converting said A.C. voltage to D.C. current which is inversely proportional to said frequency and passing said currents through relatively movable coil windings having linking magnetic fields to produce a deflection representative of the torque of the motor.

8. An apparatus as in claim 5, in which the means for developing an A.C. voltage proportional to load current is a current transformer whose output voltage is rectified by a rectifier, and the function generator responds to the rectified output, the function generator having means for changing the output thereof substantially in relation to the square of the input.

9. A method of measuring the torque developed by an A.C. motor driving a load, which method consists in developing a D.C. current that is proportional to the load current (I) of the motor, developing an A.C. voltage whose magnitude and frequency are linearly proportional to the r.p.m. of the motor shaft, converting said A.C. voltage into D.C. current which is inversely proportional to the r.p.m. of motor shaft, developing a D.C. function current which is a function of $(I)^2$ and therefore proportional to the square of the magnitude of $$\frac{V_1}{\left(R_1+\frac{R_2'}{S}\right)+j(x_1+x_2')}$$

passing said function current and said D.C. current, obtained from said A.C. voltage through the separate and relatively movable coil windings of a watt meter, thereby to produce a deflection directly proportional to the motor torque, where $V_1$ is the supply voltage to neutral, $R_1$ is the stator resistance per phase, $R_2'$ is the rotor resistance referred to the stator, S is the slip, $x_1$ is the stator reactance per phase, $x_2'$ is the rotor reactance per phase referred to the stator, and $j$ is an operator.

10. Apparatus for measuring the torque developed at the shaft of an electric motor driving a load, comprising a meter having separate and relatively movable coil windings, conductor means supplying to one of said windings a D.C. current that is a function of the motor armature current, an A.C. generator driven by the motor shaft, said generator adapted to develop an A.C. voltage whose magnitude is proportional to the r.p.m. of said motor shaft and to the supply voltage and with a frequency proportional to the r.p.m. of said motor shaft, means rectifying said A.C. voltage and developing a second D.C. current which is inversely proportional to the r.p.m. of said motor shaft, and means conducting said second D.C. current to another of said meter windings whereby the relative motion of the meter windings represents the motor torque.

11. Apparatus for measuring the torque developed at the shaft of an electric motor driving a load, comprising a meter having separate and relatively movable coil windings, conductor means supplying to one of said windings a D.C. current that is a function of the supply voltage, an A.C. generator driven by the motor shaft, said generator adapted to develop an A.C. voltage whose magnitude is proportional to the r.p.m. of said motor shaft and to the motor armature current and with a frequency proportional to the r.p.m. of said motor shaft, means rectifying said voltage and developing a second D.C. current which is inversely proportional to the r.p.m of said motor shaft, and means conducting said second D.C. current to another of said meter windings whereby the relative motion of the meter windings represents the motor torque.

12. A method of measuring the torque developed by an A.C. motor driving a load, which method consists in developing a D.C. current that is proportional to the load current ($I_L$) of the motor, developing an A.C. voltage whose magnitude and frequency are linearly proportional to the r.p.m. of the motor shaft, converting said A.C. voltage into D.C. current, which is inversely proportional to the r.p.m. of said shaft, developing a D.C. function current which is a function of ($I_L$) and therefore proportional to $$\frac{99,000 R_2'}{2\pi 746}|I_L-I_o|^2\left[\frac{\sqrt{\left(\frac{V_1}{I}-R_1\right)^2+(x_1+x_2')^2}}{R_2'}-1\right]$$

passing said function current and said D.C. current obtained from said A.C. voltage through the separate and relatively movable coil windings of a watt meter, thereby to produce a deflection directly proportional to the motor torque, where $V_1$ is the supply voltage to neutral, $R_1$ is the stator resistance per phase, $R_2'$ is the rotor resistance referred to the stator, $x_1$ is the stator reactance per phase, $x_2'$ is the rotor reactance per phase referred to the stator, $I_L$ is the load current of the motor, $I_o$ is the exciting current, and I is the magnitude of the difference between $I_L$ and $I_o$.

13. The method described in claim 9, which includes the step of measuring load torque instead of motor torque by developing an A.C. voltage whose magnitude and frequency are linearly proportional to the r.p.m. of the load shaft rather than the motor shaft.

14. Apparatus as in claim 5, in which the means for developing A.C. voltage in response to rotation of the motor shaft is a generator having a fixed field rotor and an A.C. stator winding.

15. Apparatus as in claim 5, in which the function generator is provided with an amplifier whose input is the output of the function generator, the output of the amplifier being connected to a meter coil winding.

16. The method described in claim 12, which includes the step of measuring load torque instead of motor torque by developing an A.C. voltage whose magnitude and frequency are linearly proportional to the r.p.m. of the load shaft rather than the motor shaft.

17. In combination with a motor whose torque is a function of the product of its armature current and field flux, apparatus for measuring, by means of a dynamometer type watt meter having an indicator and separate and relatively movable coil windings, the torque of said motor, which apparatus consists of an A.C. enerator having a constant magnetic field and an armature in which A.C. voltage is generated, means connecting said generator in driven relationship with said motor whereby the generated voltage and frequency are linearly proportional to the r.p.m. of said motor, a network adapted to produce a load current which is inversely proportional to the r.p.m. of said motor, said network connected between said A.C. generator and one coil winding of said meter whereby the current in said coil winding will be inversely proportional to the r.p.m. of said motor and directly proportional to the field flux of said motor, and means conducting a portion of the motor armature current to another coil winding of said meter, whereby the deflection of the indicator of said meter is proportional to the torque of said motor.

18. In combination with a motor whose torque is a function of the product of its armature voltage and field flux, apparatus for measuring, by means of a dynamometer type watt meter having an indicator and separate and relatively movable coil windings, the torque of said motor, which apparatus consists of an A.C. generator having a constant magnetic field and an armature in which A.C. voltage is generated, means connecteing said generator in driven relationship with said motor whereby the generated voltage and frequency are linearly proportional to the r.p.m. of said motor, a network adapted to produce a load current which is inversely proportional to the r.p.m. of said motor, said network connected between said A.C. generator and one coil winding of said meter whereby the current in said coil winding will be inversely proportional to the r.p.m. of said motor and directly proportional to the field flux of said motor, and means connecting the armature voltage of said motor to another coil winding of said meter whereby the current in said last mentioned coil winding is proportional to the armature voltage of said motor and wherein the deflection of the indicator of said meter is proportional to the torque of said motor.

No references cited.